United States Patent [19]

Takase et al.

[11] 4,416,239

[45] Nov. 22, 1983

[54] ELECTRONIC CONTROL SYSTEM FOR AN INTERNAL COMBUSTION ENGINE WITH CORRECTION MEANS FOR CORRECTING VALUE DETERMINED BY THE CONTROL SYSTEM WITH REFERENCE TO ATMOSPHERIC AIR PRESSURE

[75] Inventors: Sadao Takase; Akio Hosaka, both of Yokohama, Japan

[73] Assignee: Nissan Motor Company, Limited, Yokohama, Japan

[21] Appl. No.: 297,929

[22] Filed: Aug. 31, 1981

[30] Foreign Application Priority Data

Sep. 4, 1980 [JP] Japan ................................. 55-121769

[51] Int. Cl.³ ..................... F02M 51/00; F02M 25/06; F02P 3/02
[52] U.S. Cl. .................................... 123/478; 123/480; 123/489; 123/494; 123/571; 123/625
[58] Field of Search ............... 123/571, 625, 480, 489, 123/478, 494

[56] References Cited

U.S. PATENT DOCUMENTS

| 4,040,394 | 8/1977 | Wahl et al. | 123/571 X |
| 4,280,471 | 7/1981 | Masaki | 123/571 |
| 4,347,570 | 8/1982 | Akiyama et al. | 123/571 |

FOREIGN PATENT DOCUMENTS 54-153929 12/1979 Japan .

Primary Examiner—Wendell E. Burns
Attorney, Agent, or Firm—Schwartz, Jeffery, Schwaab, Mack, Blumenthal & Koch

[57] ABSTRACT

An electronic engine control system has a pressure sensor communicating both to the intake manifold and the ambient air via a valve means selectively introducing either the intake vacuum or the ambient air into the pressure sensor. The control system further includes a valve control means for controlling the operation of the valve means for selectively communicating the pressure sensor to the intake manifold and the ambient air. The valve control means is incorporated in a controller for determining the control value and adapted to produce a control signal to be supplied to the valve means in order to electrically control the valve motion.

17 Claims, 7 Drawing Figures

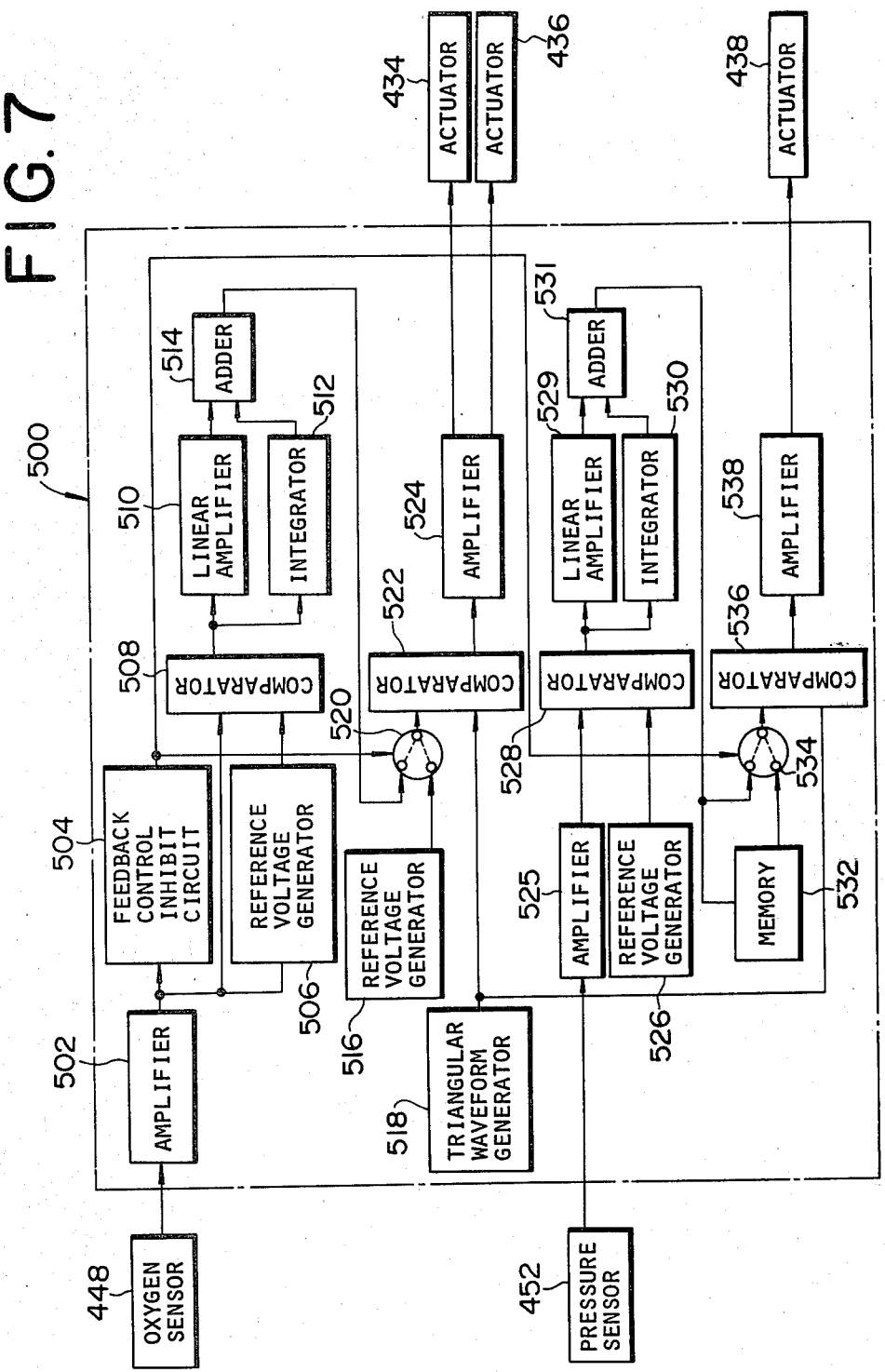

ELECTRONIC CONTROL SYSTEM FOR AN INTERNAL COMBUSTION ENGINE WITH CORRECTION MEANS FOR CORRECTING VALUE DETERMINED BY THE CONTROL SYSTEM WITH REFERENCE TO ATMOSPHERIC AIR PRESSURE

BACKGROUND OF THE INVENTION

The present invention relates generally to an electronic control system for an internal combustion engine for controlling fuel injection, spark ignition timing, air/fuel mixture ratio, exhaust gas recirculation rate and so on. More particularly, the invention relates the electronic engine control system having a pressure sensor which is capable of selectively introducing an intake vacuum pressure and atmospheric air pressure as one of the engine control parameters.

Recently, electronic engine control systems have become popular in the automotive vehicle field. In such a control system, engine operation is optimized by adapting to changing operating conditions. For example, the fuel amount to be supplied to the engine cylinders is controlled generally based on the engine speed and engine load in order to adapt to changing engine operating conditions. For determining the load condition on the engine, an intake vacuum sensor for determining the vacuum pressure in the intake manifold or an air flow meter for determining the intake air flow rate are commonly used. The determined engine load is preferably corrected for variations in atmospheric air pressure. Conventionally, the intake vacuum pressure and the atmospheric air pressure are determined separately by respective pressure sensors. This has increased the cost of the control system.

A relatively low-cost control system has been proposed in Tokkai Sho No. 54-153929 published on Dec. 4, 1979 in Japan. In this prior art, the initial preoperation pressure determined by the intake vacuum sensor, which corresponds to the atmospheric air pressure, is used as a reference value for correcting the determined engine load. However, such a system still has the drawback that it cannot follow variations of the ambient or atmospheric air pressure during engine operation.

SUMMARY OF THE INVENTION

Therefore, it is an object of the present invention to provide an electronic engine control system having a correcting means for correcting a control value depending on variation of the ambient air pressure, using only a single pressure sensor.

Another object of the present invention is to provide a pressure sensor for producing a pressure signal representative of the engine load factor in the electronic engine control system, in which the pressure sensor selectively determines the intake vacuum in the intake manifold of the air intake of the internal combustion engine and the ambient air pressure.

According to the present invention, there is provided an electronic engine control system having a pressure sensor communicating both with the intake manifold and the ambient air via a valve means selectively introducing either the intake vacuum or the ambient air into the pressure sensor. The control system further includes a valve control means for controlling the operation of the valve means for selectively exposing the pressure sensor to the intake manifold or the ambient air.

In the preferred embodiment, the valve control means is incorporated in a controller for determining the control value and adapted to produce a control signal to be fed to the valve means in order to electrically control the valve motion.

According to the embodiment of the invention in order to accomplish the above-mentioned and other objects, there is provided an electronic control system for an internal combustion engine, for controlling engine operation based on various engine control parameters, comprising sensor means for detecting the engine operating condition and producing sensor signals indicative of the detected engine operating condition, the sensor means including a pressure sensor determining the intake vacuum pressure and an ambient pressure selectively, switching means for switching the fluid introduced into the pressure sensor between the intake vacuum and the ambient air, a control unit for determining control values and producing control signals for controlling engine operation, signal generating means for producing a signal at regular intervals for activating and deactivating the switching means for switching the fluid introduced into the pressure sensor, the signal generating means being incorporated in the control unit, and correction means, incorporated in the control unit, for determining correction values for respective control values based on the determined ambient air pressure.

According to the present invention, a method for controlling the internal combustion engine operation comprising determining engine speed and producing an engine speed signal representative of the determined engine speed, determining engine temperature and producing an engine temperature signal representative of the determined engine temperature, selectively determining intake vacuum pressure in an intake manifold and ambient air pressure and producing pressure signals respectively representative of the determined vacuum pressure and ambient pressure, determining base fuel amount supplied to the engine combustion chamber based on the engine speed signal and pressure signal indicative of the intake vacuum pressure in the intake manifold, correcting the determined base fuel amount with a first correction value determined corresponding to the engine temperature signal, correcting the corrected fuel amount by a second correction value determined based on the pressure signal indicative of the determined ambient air pressure in order to produce a fuel amount control signal, and controlling the fuel amount actually supplied to the engine cylinder in response to the fuel amount control signal.

BRIEF DESCRIPTION OF THE DRAWINGS

The present invention will become more fully understood from the detailed description given hereinbelow and from the accompanying drawings of the preferred embodiment of the present invention, which, however, should not be taken as limitative of the scope of the invention but rather is presented for elucidation and explanation purposes only.

In the drawings:

FIG. 7 is a block diagram showing the details of the control circuit used in the carburetor of FIG. 6.

DESCRIPTION OF THE PREFERRED EMBODIMENT

Prior to explaining the preferred embodiments of an engine control system according to the present invention in detail, the general construction of the internal combustion engine and control system therefor is described with reference to FIGS. 1 and 2 for better understanding of the present invention.

Figure 1:
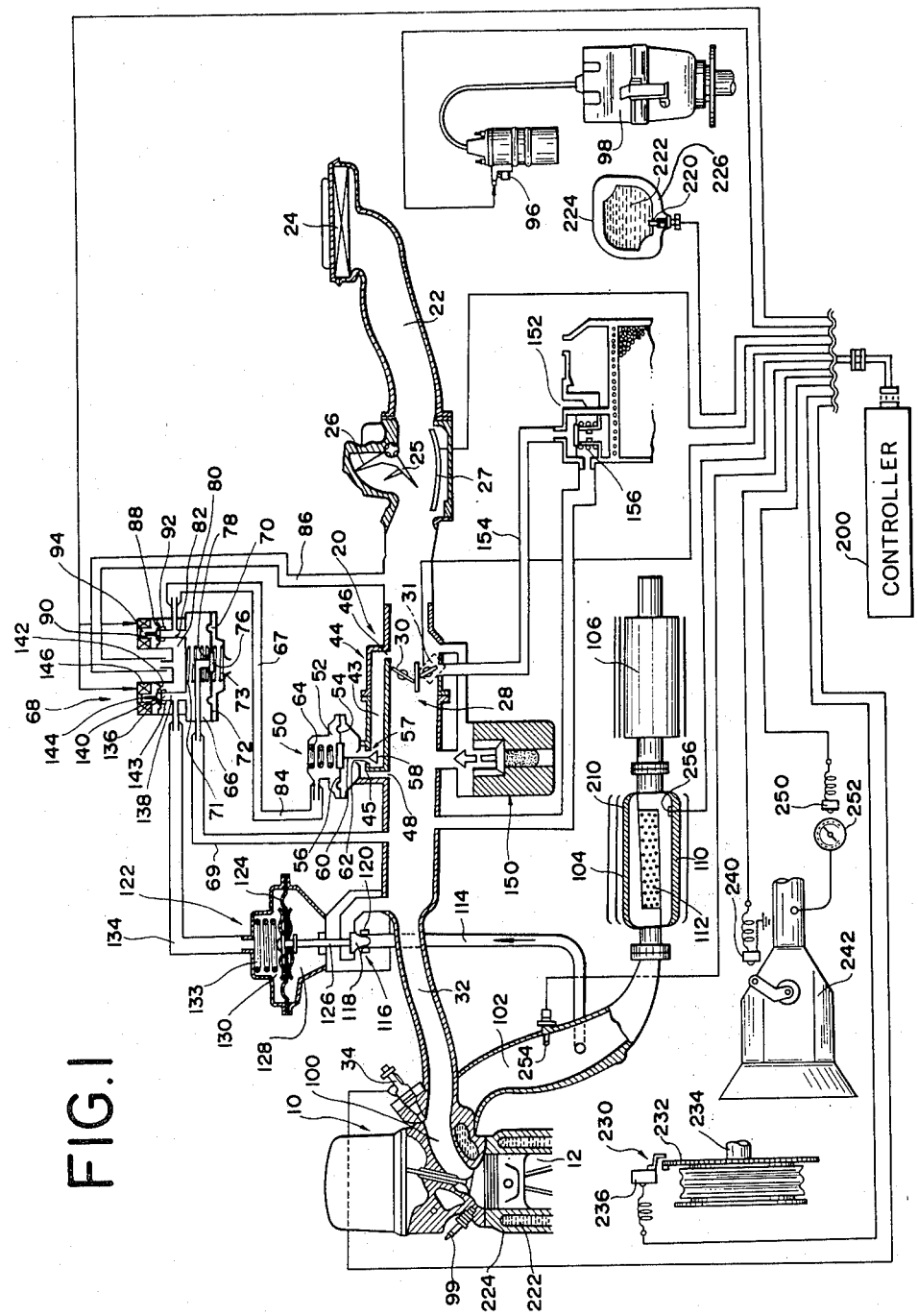
FIG. 1 is a diagramatic illustration showing the general construction of an internal combustion engine with an electronic engine control system according to the present invention.

Referring to FIG. 1, there is illustrated a fuel injection internal combustion engine having an electromagnetically-operable fuel injection valve. Also, the engine control system for the fuel injection internal combustion engine is schematically illustrated with various sensors for determining the engine operating condition and for producing sensor signals representative of corresponding engine control parameters. The control system according to the present invention is schematically shown in the form of a diagram as applied to this internal combustion engine, as an example and for the purposes of explantion only, and should not be taken as limitative of the scope of the present invention to the control system applied to this specific engine. It should be appreciated that the system according to the present invention will be applicable to any type of internal combustion engine which can be controlled by a microcomputer mounted on the vehicle.

In FIG. 1, each of the engine cyllinders 12 of an internal combustion engine 10 communicate with an air intake passage generally designated by 20. The air intake passage 20 comprises an air intake duct 22 with an air cleaner 24 for cleaning atmospheric air, an air flow meter 26 provided downstream of the air intake duct 22 to measure the amount of intake air flowing therethrough, a throttle chamber 28 in which is disposed a throttle valve 30 cooperatively coupled with an accelerator pedal (not shown) so as to adjust the flow rate of intake air flowing therethrough, and an intake manifold 32 having a plurality of conduits not clearly shown in FIG. 1. The air flow meter 26 comprises a flap member 25 and a rheostat 27. The flap member 25 is pivotably provided in the air intake passage 20 so that it can be pivotted through the cross-section thereof to vary its angular position with respect to air flow, corresponding to an air flow amount. Namely, the flap member 25 is rotated clockwise in FIG. 1 as the air flow amount increases. The rheostat 27 opposes the flap member 25 and generates an analog signal indicative of the air flow rate. The rheostat 27 is connected to an electric power supply and its resistance value varies in accordance with the air flow rate. The throttle angle sensor 31 is connected to the throttle valve 30. The throttle angle sensor 31 comprises a full throttle switch being turned on in response to opening the throttle valve through more than a given angle and an idle switch being turned on if the throttle valve is in idling position. The fuel injection amount flowing through the fuel injector 34 is controlled by an electromagnetic actuator (not shown). The actuator is electrically operated by the control system which determines fuel injection amount, fuel injection timing, and so on, according to engine operating conditions based on engine operation parameters such as engine load, engine speed, and so on. It should be noted that, although the fuel injector 34 is disposed in the intake manifold 32 in the shown embodiment, it is possible to locate it in the combustion chamber 12 in a per se well-known manner.

A bypass passage 44 is provided for the intake air passage 20. One end 46 of the bypass passage 44 opens between the air flow meter 26 and the throttle valve 30 and the other end 48 opens downstream of the throttle valve 30, near the intake manifold 32. Thus the bypass passage 44 bypasses the throttle valve 30 and connects the intake air passage 20 upstream of the throttle valve 30 to the intake manifold 32. An idle control valve, designated by 50, is provided in the bypass passage 44. The idle control valve 50 comprises two chambers 52 and 54 separated by a diaphragm 56. The bypass passage 44 is thus separated by the valve means 50 into two portions 43 and 45 respectively located upstream and downstream of the port 57 of the valve 50. The valve means 50 includes a poppet valve 58 disposed within the port 57 in such a manner that it is movable between two positions, one position opening the valve to establish communication between the portions 43 and 45 of the passage 44 and the other closing the valve to block the communication therebetween. The poppet valve 58 has a stem 60 whose end is secured to the diaphragm 56 so as to cooperatively move therewith. The diaphragm 56 is biased downwards in the drawing, so as to release the poppet valve 58 from a valve seat 62 by a helical compression coil spring 64 disposed within the chamber 52 of the valve means 50. Thereby, the valve 50 is normally opened, and normally connects the portions 43 and 45 of the bypass passage 44 to one another, via its valve port 57.

The chamber 54 of the idle control valve 50 is opened to the atmosphere to introduce atmospheric air thereinto. On the other hand, the chamber 52 of the idle control valve 50 communicates with a pressure regulating valve 68, acting as a control vacuum source, through a vacuum passage 67. The pressure regulating valve 68 is separated into two chambers 66 and 70 by a diaphragm 72. The chamber 66 of the pressure regulating valve 68 also communicates with the intake air passage 20 downstream of the throttle valve 30 through the vacuum passage 69 so as to introduce intake vacuum. The chamber 70 is open to the atmosphere in a per se well-known manner. To the diaphragm 72 is secured a valve member 76 which opposes a valve seat 78 provided at the end of a passage 74. In the chambers 66 and 70 are disposed helical compression springs 71 and 73 respectively. The springs 71 and 73 are of approximately equal spring pressure in the neutral position of the diaphragm 72. It will be noted that the chamber 66 can also be connected with an exhaust-gas recirculation (EGR) control valve 116 which recirculates part of the exhaust gas flowing through an exhaust passage 102 and exhaust recirculation passage 114 to the intake manifold 32.

The diaphragm 72 is moved upwards or downwards by changes of the balance between the vacuum in the chamber 66 and the atmospheric pressure introduced into the chamber 70. According to the motion of the diaphragm 72, the valve member 76 is moved toward or away from the valve seat 78.

Another chamber 80 is also defined in the control valve 68, which communicates with the chamber 66 through a passage 82. The passage 82 is connected with the chamber 52 of the idle control valve 50 through a control vacuum passage 67. On the other hand, the chamber 80 further communicates with the air intake passage 20 upstream of the throttle valve 30 through a passage 86 so as to introduce atomspheric air. The chamber 80 is partitioned by a diaphragm 88 on which a magnetic valve member 90 is secured. The magnetic valve member 90 opposes a valve seat 92 formed at the end of the passage 82. Also, the magnetic valve member 90 opposes an electromagnetic actuator 94, the frequency and duration of energization of which is controlled by a control pulse signal generated by a controller 200. Depending on the amount of atmospheric air introduced into the passage 82 from the chamber 80, which is determined by the ratio of energized period to deenergized period of the electromagnetic actuator 94, the control vacuum for controlling the opening degree of the valve member 58 of the idle control valve 50 is regulated and supplied to the control valve through the control vacuum passage 67.

Spark ignition plugs 99 are inserted into respective engine cylinders 12 to effect ignition at controlled times. The ignition plug 99 is connected to an ignition coil 98 which receives electric power from a distributor 96.

An exhaust system for the engine exhaust gas comprises an exhaust manifold 100, an exhaust passage 102, an exhaust gas purifier 104, a silencer 106, and an exhaust nozzle 108. The exhaust manifold 100 opens toward the engine cylinders to recieve engine exhaust gas therefrom. The exhaust passage 102 communicates with the exhaust manifold 100 and the exhaust gas purifier 104 and the silencer 106. In the shown embodiment, the exhaust gas purifier 104 comprises a purifier housing 110 and a three-way catalyst 112 disposed within the purifier housing 110. The three-way catalyst 112 oxidizes carbon monoxide CO and hydrocarbons HC and reduces nitrogen oxides $NO_x$.

An exhaust gas recirculation passage 114, which is referred to hereinafter as EGR passage, is connected to the exhaust passage 102 upstream of the exhaust gas purifier 104. The EGR passage 114 communicates with the intake manifold 32 via an exhaust gas recirculation rate control valve 116 which is hereinafter referred to as EGR control valve. The EGR control valve 116 comprises a valve member 118 with a valve seat 120 which is provided at the end of the EGR passage 114 near the intake manifold 32. The valve member 118 is incorporated in a vacuum actuator 122 and is cooperatively connected with a diaphragm 124 of the vacuum actuator 122 via a stem 126. The diaphragm 124 divides the interior of the vacuum actuator 122 into two chambers 128 and 130. The chamber 128 communicates with the atmospheric air and the chamber 130 communicates with the regulating valve 68 via a control vacuum passage 134 and contains a set spring 133. The control vacuum passage 134 joins a passage 136 connecting the vacuum chamber 66 with a chamber 138. One end of the passage 136 faces a valve member 140 secured on a diaphragm 142. A valve seat 143 is provided on the end of passage 136 sealingly receive the valve member 140.

The valve member 140 has a stem portion 144 inserted into an electromagnetic actuator 146.

The movement of the valve member 140 with respect to the valve seat 143 is controlled by the electromagnetic actuator 146. The duty cycle of the electromagnetic actuator 146 is determined by a control signal from a controller 200 described later. By the motion of the valve member 140, the intake air is admitted to the passage 136 via the passage 86 at a controlled amount. The intake air admitted into the passage 136 is mixed with the intake vacuum admitted from the intake passage 20 downstream of the throttle valve 30 via the vacuum induction passage 69 into the vacuum chamber 66, so as to produce the control vacuum. The control vacuum thus produced is fed into the chamber 130 of the actuator 122 via the control vacuum passage 134 to control open and close of the EGR control valve 116. Thereby, exhaust gas is admitted into the intake manifold 32 at a controlled rate.

An air regulator 150 is provided near the throttle chamber 28 for regulating the flow of intake air bypassing the throttle valve 30. Also, a carbon canister 152 is provided along a purge line 154. The carbon canister 152 retains hydrocarbon vapor until it is purged by air flowing through the purge line 154 to the intake manifold 32 when the engine is operated. When the engine is idling, the purge control valve 156 is closed. Only a small amount of purge air flows into the intake manifold 32 through the constant purge orifice. As engine speed and the intake vacuum increase, the purge control valve 156 opens and hydrocarbon vapor is sucked into the intake manifold 32 through both the fixed orifice and the constant purge orifice. Thus, the carbon canister 152 can reduce the emission of hydrocarbons by activation of charcoal therein.

Figure 2:
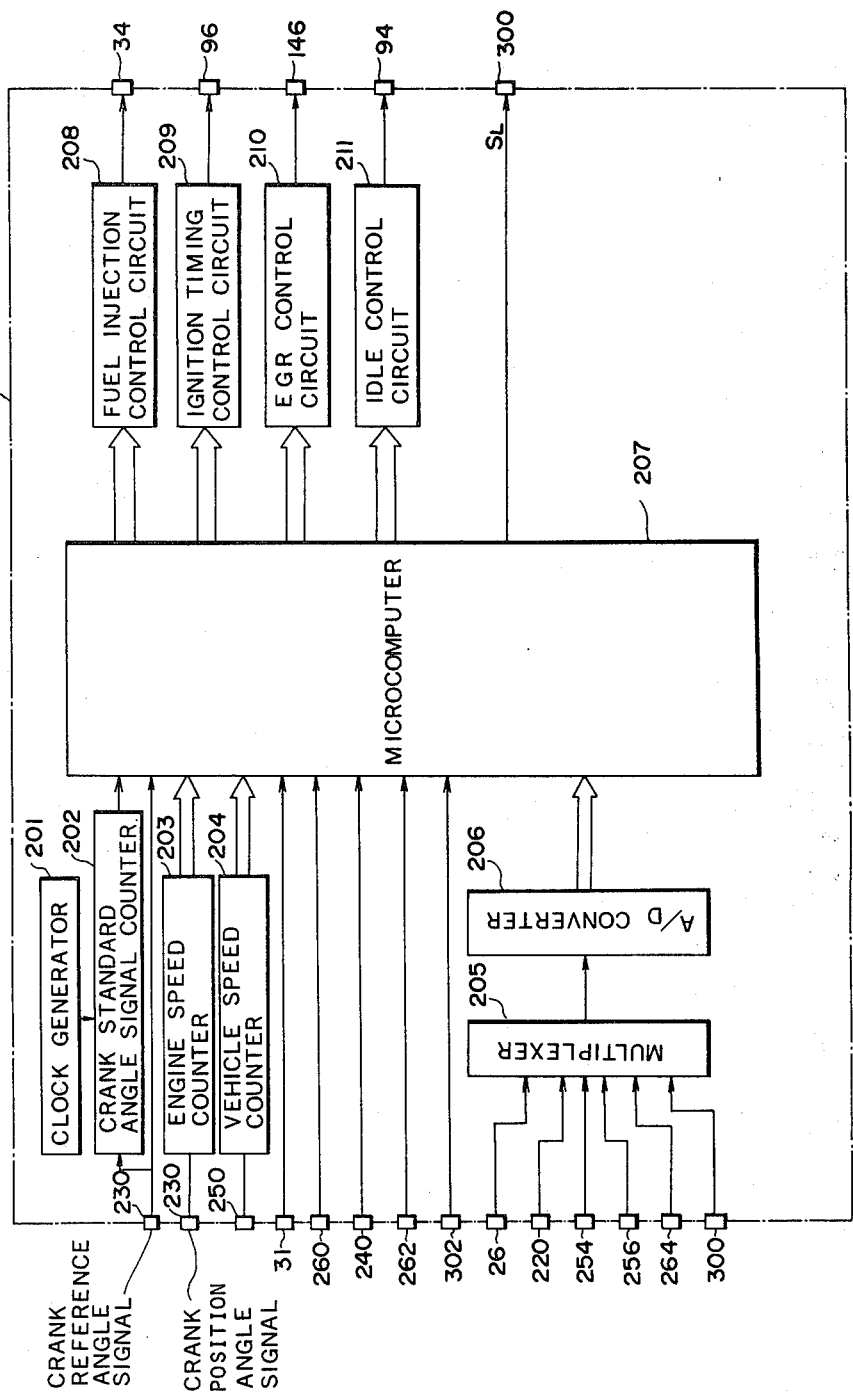
FIG. 2 is a schematic block diagram of a controller in the electronic control system of FIG. 1.

As shown in FIGS. 1 and 2, the controller 200 generally comprises a microcomputer 207 and controls a fuel injection system, a spark ignition system, an EGR system, and an engine idle speed. The controller 200 is connected to an engine coolant temperature sensor 220. The engine coolant temperature sensor 220 is inserted into a coolant chamber 222 in an engine cylinder block 224 to determine the engine coolant temperature. The engine coolant temperature sensor 220 produces an engine coolant temperature signal indicative of the determined engine coolant temperature. The engine coolant temperature signal is an analog signal having a signal value proportional to the determined engine coolant temperature and is converted into a digital signal to make it compatible to the microcomputer 207 by an analog-digital converter 206 via a multiplexer 205.

In general construction, the engine coolant temperature sensor 220 comprises a thermistor fitted onto a thermostat housing 226 provided in the coolant circulation circuit.

A crank angle sensor 230 is also connected to the controller 200. The crank angle sensor 230 generally comprises a signal disc 232 secured onto a crank shaft 234 for rotation therewith, and an electromagnetic pick-up 236. The crank angle sensor 230 produces a crank reference angle signal and a crank position angle signal. As is well-known, the crank reference angle signal is produced when the engine piston reaches a predetermined position, e.g. 70 degree before the top dead center and the crank position angle signal is produced per a given crank rotation angle, e.g., per 1 degree of crank rotation.

The crank position angle signal is inputted to an engine speed counter 203 to determine engine speed. The engine speed counter 203 produces an engine speed signal corresponding to the frequency of the reference crank angle signal. The crank reference angle signal is directly inputted to the controller 200 and is also inputted to a crank reference angle signal counter 202 which determines the periodic time of the crank reference angle signal. To the crank reference angle signal counter 202 is further inputted a clock signal produced in a clock generator 201.

A transmission neutral switch 240 is connected to the controller 200. The transmission neutral switch 240 is secured to the power transmission 242 to detect the neutral position thereof and produces a neutral signal when the transmission neutral position is detected.

Also, a vehicle speed sensor 250 is connected to the controller 200 via a vehicle speed counter 204. The vehicle speed sensor 250 is located near a vehicle speed indicator 252 and produces a pulse signal as a vehicle speed signal having a frequency proportional to the vehicle speed.

In the exhaust gas passage 102, there is provided an exhaust gas temperature sensor 256 in the exhaust gas purifier 104. The exhaust gas temperature sensor 256 determines the exhaust gas temperature and produces an analog signal as an exhaust gas temperature signal, which has an analog signal value proportional to the determined exhaust gas temperature. The exhaust gas temperature signal is fed to the microcomputer 207 via the multiplexer 205 and the analog-digital converter 206 in which the exhaust gas temperature signal is converted into the digital signal. The digital signal indicative of the exhaust gas temperature has a frequency corresponding to the analog value of the exhaust gas temperature signal. On the other hand, an exhaust gas sensor 254 such as oxygen sensor hereinafter simply referred as $O_2$ sensor 254 is provided in the exhaust passage 102 upstream of the opening end of the EGR passage 114. The $O_2$ sensor 254 determines the concentration of oxygen in the exhaust gas. The output of the $O_2$ sensor becomes high when the determined oxygen concentration is less than that of the stoichiometry and becomes low level when the oxygen concentration is more than that of the stoichiometry. The output of the $O_2$ sensor is inputted to the microcomputer 207 via the multiplexer 205 and the analog-digital converter 206 as a λ-signal.

Further, the air flow meter 26 is connected to the controller 200. The rheostat 27 of the air flow meter 26 outputs an analog signal having a signal value proportional to the determined intake air flow rate. The throttle angle sensor 31 is also connected to the controller 200 to supply the outputs of the full throttle switch and the idle switch.

As shown in block form in FIG. 2, the microcomputer 207 is further connected to an air-conditioner switch 260, a starter switch 262 and a battery voltage sensor 264. The air-conditioner switch 260 turns on when the air-conditioner is in operative position. Also, the starter switch 262 is turned on when the starter is operating. The battery voltage sensor 264 determines the vehicle battery voltage and produces an analog signal having signal value proportional to the determined battery voltage. The battery voltage signal is fed to the microcomputer 207 via the multiplexer 205 and the analog-digital converter 206.

In the shown embodiment, the controller 200 controls the fuel injection amount and timing, the spark ignition timing, EGR rate, and engine idling speed.

For controlling the fuel injection amount under stable engine conditions, which can be determined from the intake air flow rate indicated by the air flow meter 26, the engine speed indicated by the engine speed counter 203, the throttle valve angle position detected by the throttle angle sensor 31, the vehicle speed indicated by the vehicle speed counter 204 and so on, the $O_2$-sensor signal fed from the $O_2$ sensor 254 is used. Under stable engine conditions, the fuel injection amount is feedback controlled on the basis of the $O_2$ sensor signal so that the air/fuel ratio can be maintained near a stoichiometric value, such control being called λ-control. If the engine conditions are not stable, the fuel injection amount is generally determined on the basis of engine speed and intake air flow rate, the latter of which can be replaced by intake vacuum as measured downstream of the throttle valve. Under unstable engine conditions, the basic fuel injection amount determined on the basis of engine speed and air flow rate is corrected according to other parameters such as air-conditioner switch position, the transmission gear position, the engine coolant temperature and so on.

The spark ignition timing is generally controlled on the basis of engine speed, air flow rate, engine coolant temperature, and so on. Based on the engine speed, the air flow rate, the engine coolant temperature and so on which are indicative to engine operating conditions, advance and retard of the spark timing can be controlled.

The EGR control is predominantly based on air flow rate, engine speed, engine coolant temperature, ignition switch position, and battery voltage. Based on engine speed and the basic fuel injection amount determined according to engine speed and engine load, the recirculation rate of exhaust gas can be controlled. The EGR control valve is actuated by controlling the duty cycle of the actuator thereof according to the determined recirculation rate.

The engine idle speed is controlled basically according to the engine coolant temperature and engine load conditions. Under relatively cold engine conditions, engine speed is maintained at a predetermined value which is determined according to the engine coolant temperature for effecting relatively fast idling. In the normal temperature range, the engine speed is feedback-controlled on the basis of the difference between the actual engine speed and a reference engine speed determined according to engine temperature, engine load conditions, and other parameters.

In the foregoing description of the general construction of the internal combustion engine and the control system thereof, it is possible to replace the air flow meter 26 with an intake vacuum sensor. In this case, the intake vacuum sensor is connected to the intake manifold 32. In the detailed description of the preferred embodiment which is given herebelow, the engine load condition is determined by the intake vacuum sensor in order to illustrate the present invention.

Figure 3:
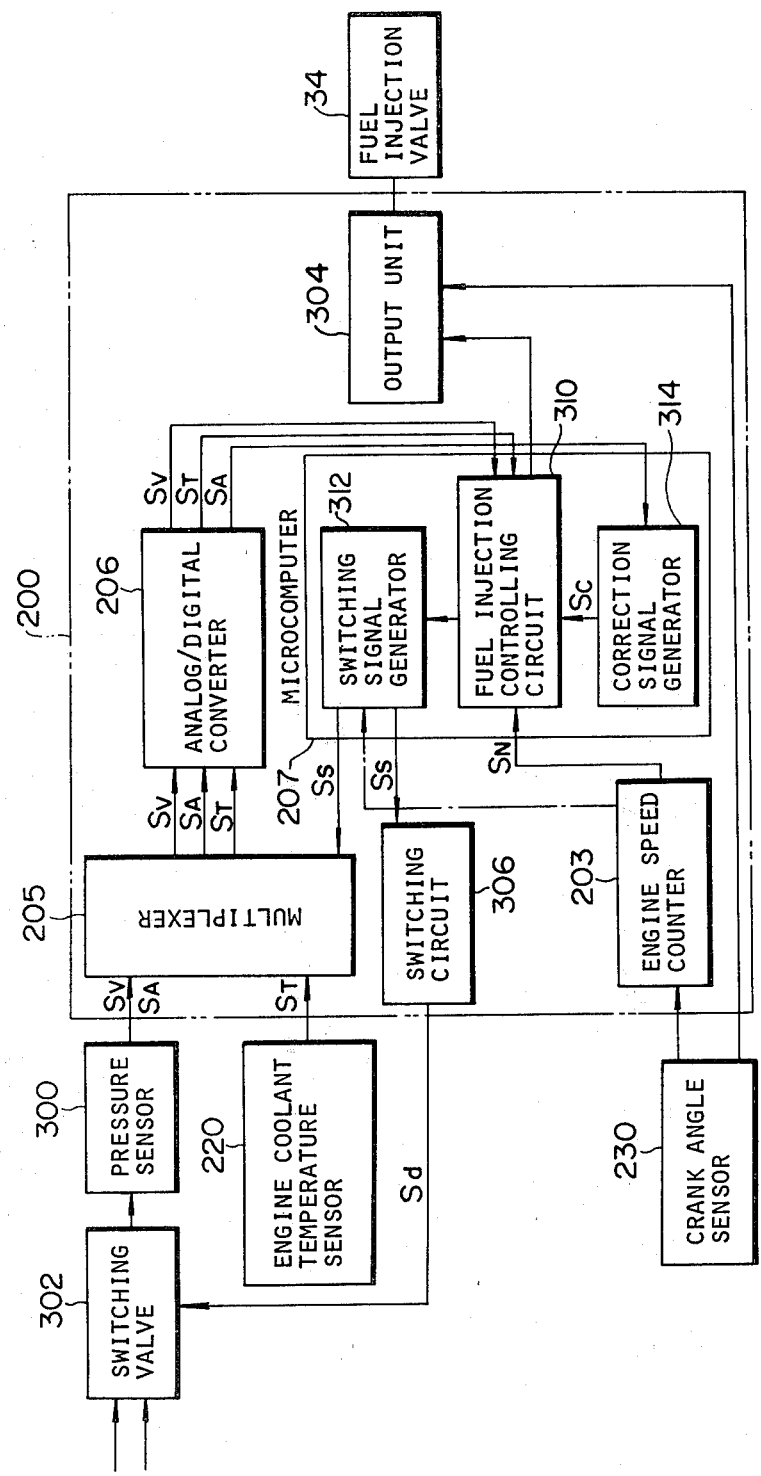
FIG. 3 is a block diagram of a preferred embodiment of a fuel injection control system for a fuel injection internal combustion engine according to the present invention.

Referring now to FIG. 3, there is illustrated a preferred embodiment of the fuel injection control system in the engine control system according to the present invention. In the shown embodiment, the load condition on the engine is determined on the basis of the intake vacuum pressure measured by a pressure sensor 300. The pressure sensor 300 communicates with the intake manifold 32 of the air intake passage 20 via a switching valve 302. The switching valve 302 also communicates with the atmosphere for introducing intake vacuum and atmospheric air selectively to the pressure sensor 300. The pressure sensor 300 determines the pressure of the fluid introduced thereinto and produces a pressure sensor signal corresponding to the determined fluid pressure. The pressure sensor can be of any suitable construction adapted for measuring the instantaneous pressure of the fluid. For example, a pressure sensor having piezo-electric member for measuring magnitude of the introduced fluid pressure can be used as the pressure sensor 300.

The pressure sensor signal representative of the measured vacuum pressure $S_V$ or atmospheric pressure $S_A$ is supplied to the multiplexer 205. The multiplexer 205 inputs the sensor signal to the microcomputer using a time sharing scheme. The pressure sensor signal supplied from the multiplexer 205 is converted into a digital signal indicative of the measured fluid pressure by the analog-digital converter 206. Therefore, the sensor signal supplied by the pressure sensor 300 is inputted to the microcomputer 207 in the form of a digital signal. To the multiplexer 205, also is inputted the engine coolant temperature signal $S_T$ from the engine coolant temperature sensor 220. The engine coolant temperature signal $S_T$ is also supplied to the analog-digital converter 206 to be converted into the digital signal indicative of the determined engine coolant temperature.

The engine speed detector including the crank angle sensor 230 is also connected to the microcomputer 207 via the engine speed counter 203. The engine speed counter 203 determines the engine speed and produces a digital signal $S_N$ representative of the determined engine speed.

The pressure sensor signal $S_V$ and the engine coolant temperature signal $S_T$ are inputted to a fuel injection controlling circuit 310 in the microcomputer 207 via the multiplexer 205 and the analog-digital converter 207 using time sharing. At the same time, the engine speed signal $S_N$ is inputted to the microcomputer 207 from the engine speed counter 203. The fuel injection controlling circuit 310 of the microcomputer 207 processes the pressure sensor signal $S_V$ representative of the load condition on the engine, the engine coolant temperature signal $S_T$ and the engine speed signal $S_N$ for determining the amount of fuel injected.

At first, the fuel injection controlling circuit 310 of the microcomputer determines a base fuel injection amount based on the pressure sensor signal $S_V$ and the engine speed signal $S_N$ and produce a base fuel injection pulse having a pulse width corresponding to the determined fuel injection amount. There are many well-known ways to determine the base fuel injection amount, for example, arithmetic operation effected in the central processing unit of the microcomputer or table look-up and so on. Such a method for determining the base fuel injection amount is per se well-known for those skilled in the art and, therefore, may not be necessary to be discussed in detail. The base fuel injection amount is corrected by a correction value determined on the basis of the engine coolant temperature signal $S_T$. The base fuel injection pulse width is thus corrected corresponding to the determined correction value therefor, according to the engine coolant temperature.

The determined fuel injection pulse is conducted to the electromagnetically operable actuator of the fuel injection valve 34 through an output unit 304. The fuel injection pulse defines the ratio of energized period and deenergized period of the actuator for controlling the action of the fuel injection valve.

The microcomputer 207 has a switching signal generator 312 which produces a switching signal $S_S$ to be supplied to a switching circuit 306 at a given timing. The switching circuit 306 is responsive to the switching signal $S_S$ from the switching signal generator 312 of the microcomputer 207 to generate a drive signal $S_d$. The drive signal $S_d$ is fed to the switching valve 302 for actuating the same. The switching valve 302 is responsive to the drive signal $S_d$ to switch the fluid to be introduced into the pressure sensor 300 from intake vacuum to atmospheric air or from atmospheric air to intake vacuum. In the shown embodiment, the switching signal $S_S$ produced in the microcomputer 207 is also fed to the multiplexer 205 to define the timing of switching of output of the multiplexer 205 between the pressure sensor signal and engine coolant temperature signal. The multiplexer 205 also receives various other sensor signals as shown in FIG. 2 and outputs the signals using time sharing in synchronism with the signal fed from the microcomputer.

It will be appreciated that the signal fed from the microcomputer 207 to the switching circuit 306 and the multiplexer can define respectively different timings for the switching valve 302 and the multiplexer 205. Further, it is to be appreciated that the timing defined by the signal from the microcomputer can be preset in the microcomputer or can be synchronized with the engine revolution.

Here, the fuel injection pulse width to be fed to the actuator of the fuel injection valve 34 is further corrected with reference to the atmospheric pressure factor as follows:

$$P_i = (P \times const)/N \times f_1 \times f_2 \times f_3$$

where
$P_i$: fuel injection pulse width to be fed to the actuator;
P: base fuel injection pulse width;
const: constant value given for the engine;
N: engine speed
$f_i$: correction factor based on the engine coolant temperature;
$f_2$: correction factor based on the ambient air pressure; and
$f_3$: correction factor based on the battery voltage.

The microcomputer 207 is therefore provided with a correction signal generator 314 for determining a correction value $S_C$ for the fuel injection pulse width based on the ambient pressure factor according to the foregoing equation.

Figure 4:
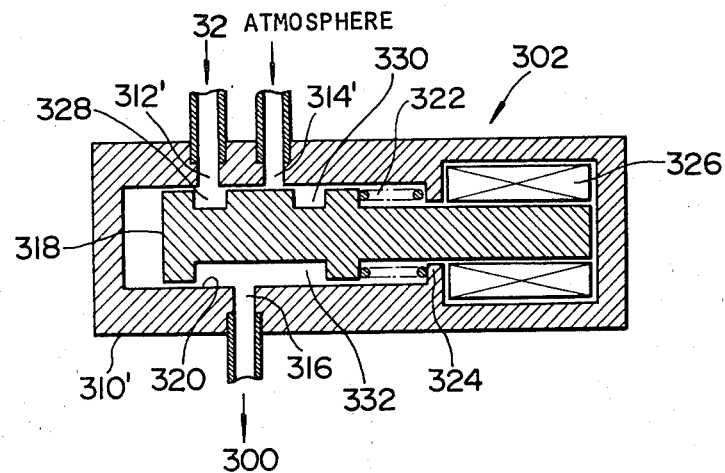
FIG. 4 is a cross-sectional view of a switching valve in the fuel injection system of FIG. 3.
Figure 5:
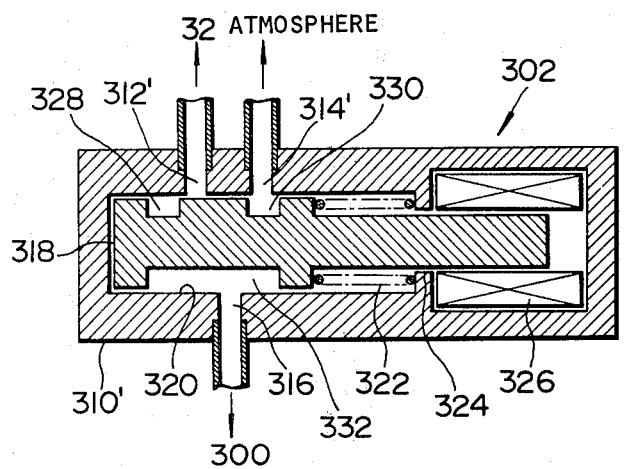
FIG. 5 is a view similar to FIG. 4 but showing the valve position in which the actuator is deenergized.

FIGS. 4 and 5 show a preferred embodiment of the switching valve 302 of FIG. 3. The switching valve 302 has a valve housing 310' having a first inlet port 312' connected to the intake manifold 32, a second inlet port 314' opening to the atmosphere and an outlet port 316 connected to the pressure sensor 300. A valve member 318 is disposed within a chamber 320 defined within the valve housing 310 so as to be free to slide reciprocally. The valve member 318 is biased toward one axial end of the chamber by a bias spring 322 which is seated onto a spring seat 324 projecting inwards from the internal periphery of the chamber 320. An electromagnetic actuator 326 is also disposed within the chamber 320 at the other axial end of the chamber. The actuator 326 surrounds the end of the valve member 318. The valve member 318 is formed with annular recesses 328 and 330 on the side facing the inlet ports. The annular recesses 328 and 330 are located axially spaced apart from each other such that when the recess 328 faces the first inlet port 312, the other recess 330 is not aligned with the second inlet port 314 and when the recess 330 faces the second inlet port 314, the recess 328 is not aligned with the first inlet port 312. Facing the outlet port 316, the valve member 318 is formed with an axially-extending groove 332. The groove 332 connects the annular recesses 328 and 330 in the longitudinal direction and always faces the outlet port 316.

In the case shown in FIG. 4, the valve member 318 is pulled toward the actuator 326 to establish communication between the first inlet port 312 and the outlet port 316. The valve member 318 is maintained this position while the actuator 326 is activated. When the duration defined by the signal fed from the microcomputer 207 expires, the valve member 318 is moved to align the annular recess 330 with the second inlet port 314 as shown in FIG. 5. In this position, the second inlet port 314 communicates with the outlet port 316 to introduce the atmospheric air into the pressure sensor 300.

It is necessary to adjust spark ignition timing according to the fuel injection amount and to the atmospheric air pressure. Namely, for determining the spark ignition timing, the air/fuel ratio is one control parameter. As is well-known, if the air/fuel mixture is relatively rich, the spark advance is to be retarded. Therefore, in areas of relatively high altitude, the air/fuel mixture becomes rich due to the relatively low atmospheric pressure. The spark ignition timing in this case is thus retarded for effecting ignition with suitable timing.

Likewise, if the atmospheric air pressure is relatively low, the air flow rate flowing through the air intake passage is necessarily increased to obtain necessary engine output power and the intake vacuum drops in accordance with the increase in the intake air flow rate. Since the exhaust gas recirculation rate is determined in dependence upon the intake vacuum in the intake manifold, the exhaust gas amount recirculated into the engine cylinder becomes smaller than that required when the vacuum pressure has dropped due to relatively low ambient pressure. Therefore, the exhaust gas recirculation rate determined on the basis of intake vacuum is to be corrected in accordance with the ambient air pressure condition.

Figure 6:
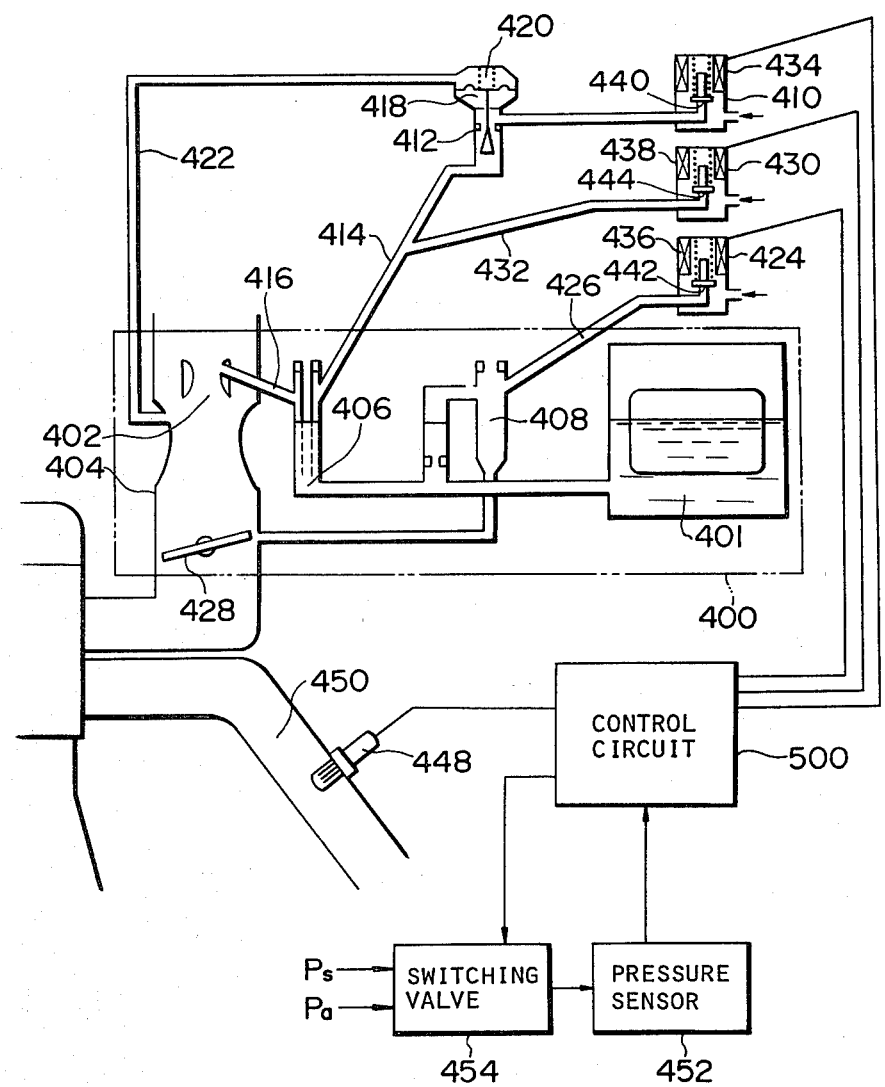
FIG. 6 is a diagramatic illustration showing another embodiment of the control system according to the invention, which is adapted for controlling an electronically controlled carburetor.

Although the foregoing description has been directed to the internal combustion engine having an electronically controlled fuel injection valve, the control system according to the present invention is also applicable for the engine having an electronically controlled carburetor. FIG. 6 shows schematically the second embodiment of the control system which is applied for controlling an electronically controlled carburetor. The carburetor 400 comprises a float chamber 401 connected to a venturi 402 in the air intake passage 404 via a main fuel passage 406 and a slow fuel passage 408. The main fuel passage 406 is connected with a main air control valve 410 via a control valve 412 and via a first auxiliary air passage 414. The main fuel passage 406 is also connected to the venturi portion 402 through a fuel nozzle 416. The control valve 412 has two chambers 418 and 420. The chamber 418 communicates with the atmosphere and the chamber 420 communicates with the venturi 402 through a passage 422.

On the other hand, the slow fuel passage 408 is connected with a slow air control valve 424 via a second auxiliary air passage 426. The slow fuel passage 408 is, in turn, connected to the air intake passage downstream of a throttle valve 428.

An auxiliary air control valve 430 is connected to the first auxiliary air passage 414 through an air passage 432. Each of the air control valves 410, 424, and 430, respectively, has electromagnetically operative actuators 434, 436, and 438 and valve members 440, 442, and 444 for opening and closing the ends of the air passages 414, 426, and 432. The actuators 434, 436, and 438 are respectively connected to a control circuit 500. Similar to the foregoing first embodiment, the control circuit 500 includes a microcomputer which comprises an air/fuel ratio control circuit, a switching signal generator, and a correction signal generator which produces a correction value depending on the determined ambient air pressure. The control circuit 500 receives various sensor signals respectively indicative of the engine operating conditions. For example, the air/fuel ratio of the air/fuel mixture supplied to the engine cylinder is feedback-controlled on the basis of the oxygen concentration in the exhaust gas, which is measured by an oxygen sensor 448 provided in the exhaust passage 450. Also, the pressure sensor 452 is connected to the control circuit 500. The pressure sensor 452 is supplied with either the intake vacuum $P_s$ in the intake manifold or atmospheric air $P_a$, selectively. For this purpose, the switching valve 454 is connected to the pressure sensor 452 for selectively introducing the intake vacuum and atmospheric air at the appropriate time.

In the feedback control of the air/fuel ratio, the control circuit 500 produces a control pulse signal defining the ratio of the energized period to the deenergized period of the actuators 434 and 436 to control the air/fuel ratio to a stoichiometric value. For this purpose, the air flow rate through the air passages 414 and 426 are controlled by controlling the duration of the actuator being activated to open the air control valves 410 and 424.

To the actuator 438 of the auxiliary air control valve 430, the control circuit 500 supplies a control pulse signal defining the ratio of energized period and deenergized period thereof. The auxiliary air control valve 430 permits air flow therethrough while the actuator 438 is energized. The pulse width of the control pulse signal to be fed to the actuator 438 is varied according to the atmospheric air pressure measured by the pressure sensor 452.

The control circuit 500 further determines the spark ignition timing, exhaust gas recirculation rate and so on, on the basis of various engine operating conditions inputted thereto, however not shown. Based on the engine operating conditions, the control circuit 500 produces the spark ignition signal and control signal for the exhaust gas recirculation control valve (not shown). The spark ignition signal and the control signal for the exhaust gas recirculation valve are corrected by a correction value according to the atmospheric air pressure.

Referring in greater detail to FIG. 7, one embodiment of the control circuit 500 is illustrated as comprising an amplifier 502 having an input from the oxygen sensor 448 which produces an output voltage signal corresponding to the air/fuel ratio of the mixture created by the carburetor. The amplified voltage signal is then applied directly to one input of a first comparator 508 and also to a reference voltage generator circuit 506 which serves to smooth the received voltage signal and applies it to the other input of the first comparator 508.

The first comparator 508 produces at its output a voltage signal indicative of the deviation of the sensed air/fuel ratio from the reference value established by the reference voltage generator circuit 506.

The deviation signal is then applied to a linear amplifier 510 which outputs a voltage signal proportional to the deviation signal, and also to an integrator circuit 512 which integrates the deviation signal. The output signals from the linear amplifier 510 and integrator circuit 512 are applied to an adder 514 wherein they are added. The output signal from the adder 514 is supplied through first switch means 520 to one input of a second comparator 522, the other input of which is coupled to a triangular waveform generator circuit 518. The output of the second comparator 522 will be a squarewave whose duty cycle is dependent upon the voltage signal at the first input of the second comparator 522 or the output of the adder 514 in this case. The squarewave pulse signal from the second comparator 522 is then amplified in an amplifier 524. The output of the amplifier 524 is supplied as the first drive pulse signal to the actuators 434 and 436. The first drive pulse signal has a duty cycle dependent upon the output signal of the adder 514. Thus, the duty ratio of the "on" or high time of the first drive signal to the "off" or low time thereof will increase to extend the time period during which the actuator 434 and 436 are energized to open the air control valves 410 and 424 when the sensed air/fuel ratio is richer (in terms of fuel) than the reference value established in the reference voltage generator circuit 506, and decrease to shorten the energized time period of the actuator 434 and 436 when the sensed air/fuel ratio is leaner (in terms of fuel) than the reference value.

On the other hand, the output of the pressure sensor 452 is inputted to a third comparator 528 through an amplifier 525. Also, a reference voltage generator 526 outputs a signal representative of a predetermined atmospheric air pressure. The third comparator 528 compares the two inputs to determine the difference between the determined atmospheric air pressure and the predetermined value. The output of the third comparator 528 is supplied to a linear amplifier 529 to induce therein a voltage signal proportional to the deviation represented by the comparator output. The third comparator output is at the same time integrated by an integrating circuit 530. The outputs of the linear amplifier 529 and the integrating circuit 530 are coupled in an adder 531 and supplied via second switch means 534 to one input of a fourth comparator 536, the other input of which is coupled to the triangular waveform generator 518. The output of the fourth comparator 536 will be a squarewave whose duty cycle is dependent upon the voltage signal at the one input of the fourth comparator 536 or the output of the adder 531 in this case. The squarewave pulse signal from the fourth comparator 536 is then amplified by an amplifier 538. The output of the amplifier 538 is supplied as the second drive pulse signal to the actuator 438. The second drive pulse signal has a duty cycle variable in accordance with atmospheric air pressure. The duty cycle of the second drive pulse signal will increase to extend the time period during which the air control valve 430 opens if the pressure sensor output is smaller than the reference voltage established by the reference voltage generator 526. The duty ratio of the second drive pulse signal will decrease to shorten the open time period of the air control valve 430 if the pressure sensor output is larger than the reference voltage.

In order to interrupt the air/fuel ratio feedback control under engine warm-up and/or other engine operating conditions where the oxygen sensor 448 produces unstable air/fuel ratio measurements, a feedback control inhibit circuit 504 is provided which produces an inhibit signal, for example, when the output of the oxygen sensor 448 remains unchanged for a predetermined interval. The inhibit signal is supplied to the first switch means 520 which thereby disconnects the second comparator 522 from the adder 514 and instead connects the comparator to a reference voltage generator 516. The result is that the duty cycle of the first drive pulse signal is held at a predetermined value established by the reference voltage generator 516, regardless of the oxygen sensor output. The inhibit signal is also supplied to the second switch means 534 which thereby disconnects the fourth comparator 536 from the adder 531 and instead connects the comparator to a nonvolatile memory 532 wherein the output of the adder 531 is stored. As a result, the duty cycle of the second drive pulse signal is held at a fixed value corresponding to the output of the adder 531 just before the application of the inhibit signal to the second switch means 534. Thus, under engine warm-up conditions where the oxygen sensor 448 tends to provide unstable air/fuel ratio measurements, the first drive pulse signal duty cycle is held at a predetermined value so as to maintain a stoichiometric air/fuel ratio whereas the second drive pulse duty cycle is held at a fixed value dependent upon altitude conditions.

As stated hereabove, there can be provided an engine control system having a pressure sensor which can determine both the intake vacuum pressure and the atmospheric air pressure. This makes it possible for the control operation of control system possible to follow variations in the the atmospheric air pressure.

Thus, the present invention fulfills all of the objects and advantages sought therefor.

What is claimed is:

1. An electronic control system for an internal combustion engine for controlling the engine operation based on at least an intake vacuum pressure of the engine and an atmospheric air pressure comprising:
a pressure sensor for measuring a pressure introduced;
switching means for selectively introducing an intake vacuum pressure and an atmospheric air pressure into said pressure sensor;
signal generating means for producing a signal for switching over said switching means; and
a control unit for receiving a pressure signal from said pressure sensor and producing a control signal for controlling the engine operation.

2. An electronic control system for an internal combustion engine for controlling the engine operation based on various engine control parameters comprising:
an engine speed sensor for determining the engine revolution speed and producing an engine speed signal representative of the determined engine speed;
engine temperature sensor for determining the engine temperature and producing an engine temperature signal representative of the determined engine temperature;
engine load sensor for determining the load conditions of the engine, said engine load sensor including a pressure sensor for determining a pressure introduced;
switching means associated with said pressure sensor for selectively introducing vacuum pressure and an atmospheric pressure into said pressure sensor;

a control unit for controlling fuel supply, spark ignition and exhaust gas recirculation, said control unit determining control values for controlling engine operation on the basis of the sensor signals fed from the engine speed sensor, engine temperature sensor and engine load sensor; and switch signal generating means, incorporated within said control unit and associated with said switching means, for producing a switching signal for controlling switching over said switching means.

3. The system as set forth in claim 1 or 2, wherein said switching means comprises a flow control valve assembly including a valve housing having first inlet port communicating with the intake manifold, second inlet port communicating with the ambient air, and an outlet port communicating with said pressure sensor, a valve member disposed within said valve housing and being movable between a first position wherein said first inlet port communicates with said outlet port and second position where said second port communicates with said outlet port, and an actuator for moving said valve member between said first and second position, said actuator being responsive to said signal supplied from the signal generating means.

4. The system as set forth in claim 3, wherein said signal generating means produces the signal to be supplied to said switching means in synchronism with the engine revolution.

5. The system as set forth in claim 3, wherein said control unit comprises a multiplexer, an arithmetic circuit, and an output unit, said multiplexer being responsive to said signal supplied from said signal generating means for selectively inputting the sensor signal to said arithmetic circuit.

6. A method for controlling an internal combustion engine comprising;

detecting engine operating conditions including detecting engine intake vacuum and atmospheric air pressure alternatively at a given timing by selectively applying said engine vacuum and said atmospheric air pressure to a sensor;

determining a basic fuel amount to be supplied to the engine combustion chamber based on detected engine operating conditions including said intake vacuum;

correcting said basic fuel amount by a correction value determined according to said atmospheric air pressure to produce a fuel amount control signal; and controlling the fuel amount actually supplied to the engine cylinder in response to the fuel amount control signal.

7. The method as set forth in claim 6, wherein said method further comprises:

determining air/fuel ratio based on the oxygen concentration in the exhaust gas;

determining spark ignition timing based on the determined air/fuel ratio according to the atmospheric air pressure.

8. The method as set forth in claim 6 or 7, wherein said method further comprises:

determining a basic value of exhaust gas recirculation rate for recirculating the exhaust gas into the engine cylinder; and correcting the determined basic exhaust gas recirculation rate depending on a correction value determined according to atmospheric air pressure.

9. An electronic control system for an internal combustion engine for controlling engine operation based on at least an intake vacuum pressure of the engine and an atmospheric air pressure comprising:

a pressure sensor for measuring a pressure introduced and producing a pressure signal representative of said pressure introduced;

switching means, associated with said pressure sensor, for selectively introducing an intake vacuum pressure and an atmospheric air pressure into said pressure sensor, said switching means periodically switching introducing of said intake vacuum pressure and said atmospheric pressure to said pressure sensor at a given timing; and a control unit for receiving said pressure signal from said pressure sensor and producing a control signal for controlling the engine operation.

10. An electronic control system for an internal combustion engine for controlling engine operation based on various engine control parameters comprising:

an engine speed sensor for determining engine revolution speed and producing an engine speed signal representative of the determined engine speed;

an engine temperature sensor for determining engine temperature and producing an engine temperature signal representative of the determined engine temperature;

an engine load sensor for determining load conditions of the engine, said engine load sensor including a pressure sensor for determining a pressure introduced and producing a pressure signal representative of said pressure introduced;

switching means associated with said pressure sensor for selectively introducing vacuum pressure and an atmospheric pressure into said pressure sensor, said switching means being operative at a given timing for changing over introduction of said intake pressure and said atmospheric pressure; and a control unit for controlling fuel supply, spark ignition and exhaust gas recirculation, said control unit determining control values for controlling engine operation on the basis of the signals produced by the engine speed sensor, engine temperature sensor and engine load sensor.

11. An electronic control system for an internal combustion engine for controlling engine operation based on at least an intake vacuum pressure of the engine and an atmospheric air pressure comprising:

a pressure sensor for measuring a pressure introduced and producing a pressure signal representative of said pressure introduced;

switching means, associated with said pressure sensor, for selectively introducing an intake vacuum pressure and an atmospheric air pressure into said pressure sensor; and a control unit, associated with said switching means to produce a periodic signal for operating said switching means for switching introduction of said intake vacuum pressure and said atmospheric pressure at a given timing, said control unit receiving said pressure signal from said pressure sensor and producing a control signal for controlling the engine operation.

12. An electronic control system for an internal combustion engine for controlling engine operation based on various engine control parameters comprising:

an engine speed sensor for determining the engine revolution speed and producing an engine speed signal representative of the determined engine speed;

engine temperature sensor for determining the engine temperature and producing an engine temperature signal representative of the determined engine temperature;

engine load sensor for determining the load conditions of the engine, said engine load sensor including a pressure sensor for determining a pressure introduced and producing a pressure signal representative of said pressure introduced;

switching means associated with said pressure sensor for selectively introducing vacuum pressure and an atmospheric pressure into said pressure sensor; and a control unit associated with said switching means to produce a periodic signal for operating said switching means at a given timing, said control unit controlling fuel supply, spark ignition and exhaust gas recirculation, said control unit determining control values for controlling engine operation on the basis of the signals produced by the engine speed sensor, engine temperature sensor and engine load sensor.

13. The system as set forth in claim 9 or 10, wherein said switching means comprises a flow control valve assembly including a valve housing having a first inlet port communicating with an intake manifold, a second inlet port communicating with atmospheric pressure, and an outlet port communicating with said pressure sensor, a valve member disposed within said valve housing and being movable between a first position wherein said first inlet port communicates with said outlet port and second position where said second inlet port communicates with said outlet port, and an actuator for moving said valve member between said first and second positions, and switching signal generating means associated with said switching means for supplying a signal to said switching means for controlling said actuator to move said valve member.

14. The system as set forth in claim 13, wherein said control unit comprises a multiplexer connected to receive said sensor signals, an arithmetic circuit, and an output unit, said multiplexer being responsive to said signal supplied from said switching signal generating means for selectively inputting said sensor signals to said arithmetic circuit.

15. The system as set forth in claim 11 or 12, wherein said switching means comprises a flow control valve assembly including a valve housing having a first inlet port communicating with an intake manifold, a second inlet port communicating with ambient air, and an outlet port communicating with said pressure sensor, a valve member disposed within said valve housing and being movable between a first position wherein said first inlet port communicates with said outlet port and second position where said second inlet port communicates with said outlet port and an actuator for moving said valve member between said first and second positions, said control unit including switch signal generating means for producing said signal for operating said switching means and said actuator being responsive to said signal from the switching signal generating means.

16. The system as set forth in claim 15, wherein said control unit comprises a multiplexer connected to receive said sensor signals, an arithmetic circuit, and an output unit, said multiplexer being responsive to said signal supplied from said switching signal generating means for selectively inputting said sensor signals to said arithmetic circuit.

17. A method for controlling an internal combustion engine comprising;

detecting engine operating conditions including detecting engine intake vacuum and atmospheric air pressure alternatively at a given timing by selectiveoly applying said engine vacuum and said atmospheric air pressure to a sensor;

determining a basic value of exhaust gas recirculation rate for recirculating exhaust gas into the engine cylinders based on engine operating conditions including said intake vacuum; and correcting the determined basic exhaust gas recirculation rate depending on a correction value determined according to said atmospheric air pressure;

controlling the exhaust gas recirculation rate depending upon the corrected value.

* * * * *